July 26, 1927. H. R. LONGANECKER Re. 16,688

CLAMP

Original Filed July 29, 1925

R. Q. Thomas

H. R. Longanecker INVENTOR

BY Victor J. Evans

ATTORNEY

WITNESS:

Reissued July 26, 1927. Re. 16,688

UNITED STATES PATENT OFFICE.

HARRY R. LONGANECKER, OF CENTERVILLE, IOWA.

CLAMP.

Original No. 1,615,092, dated January 18, 1927, Serial No. 46,840, filed July 29, 1925. Application for reissue filed June 14, 1927. Serial No. 198,856.

This invention relates to improvements in clamps, the general object being to securely clamp and rigidly secure a stub pole to the ordinary type of telegraph or telephone pole when the latter has been materially deteriorated at its base and is likely to fall.

Another object of the invention resides in the peculiar construction of my clamp per se in the provision of a saddle secured to and interposed between the corresponding inner sides of the stub and pole and adapted to have securely connected to the opposite ends thereof, clamping bands encircling the outer sides of the stub and pole whereby the stub and pole are spaced and held rigidly in their vertically disposed positions and against accidental displacement.

With the above and other objects in view, the invention further includes the following novel features and details of construction, to be hereinafter more fully described, illustrated in the accompanying drawing and pointed out in the appended claim.

Figure 1:
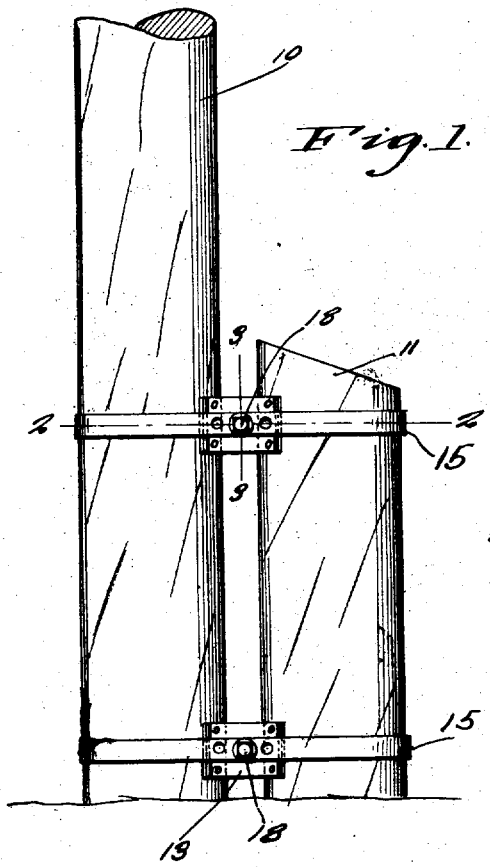
Figure 1 is a fragmentary elevation of a stub and pole showing my present invention applied thereto.
Figure 3:
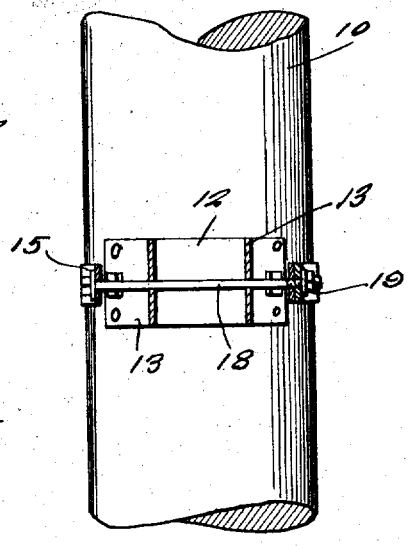
Figure 3 is a vertical sectional view taken on line 3—3 of Figure 1 through one of the saddles and clamping bands.

Referring to the drawing in detail, wherein like characters of reference denote corresponding parts, the reference characters 10 and 11 indicate respectively a telegraph pole and stub therefor, said stub being used for strengthening and supporting the pole 10 when the said pole has been materially deteriorated at its base through rot and the like, the above is the means now utilized in strengthening weakened telegraph poles and forms no part of the present application for Letters Patent but is merely shown for the purpose of illustration in bringing forward the novel advantages of the above entitled invention.

Figure 2:
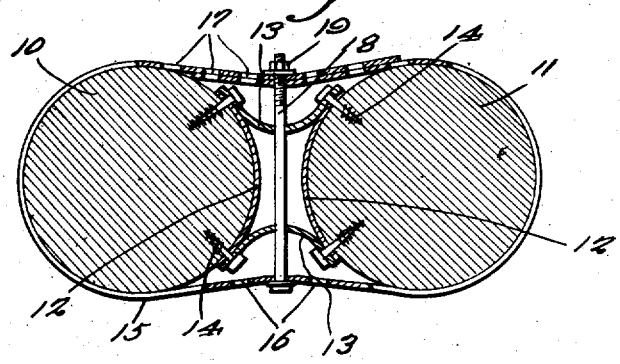
Figure 2 is a transverse section taken on line 2—2 of Figure 1.

The invention resides in the provision of saddles formed of arcuate shaped guide plates 12 and arcuate shaped end plates 13; having their ends arranged in overlapping relation and receiving fastening elements 14 in the form of screws or the like which have their threaded portions embedded within the corresponding sides of the pole 10 and stub 11 in the manner clearly illustrated in Figure 2 of the drawing. It will thus be noted that these arcuate shaped side plates 12 conform to the curvature of the outer side walls of the pole 10 and stub 11 in order that the same may snugly lie thereagainst while the side arcuate shaped end plates 13 hold the arcuate side plates 12 apart and against the corresponding side of the pole 10 and stub 11.

In order to further provide means for strengthening and supporting the said pole 10, I provide bands 15 which are wrapped around the said pole 10 and stub 11 in alignment with the said saddles thus arranged between the said pole 10 and stub 11 and having openings 16 arranged at intermediate points of their lengths while their over-lapping ends include registering openings 17 therein whereby a bolt as indicated at 18 may be readily and easily inserted within any one of the openings 16 and extend centrally and longitudinally through the semi-circular end plates 13 while threaded end portions protrude through the registering openings 17 and receive a securing element in the form of a nut 19 thereon and when being screwed home will bend the said bands 15 inwardly at their intermediate points adjacent the outer side of the semi-circular end plates 13, as clearly illustrated in Figure 2 of the drawing, whereby the said bands 15 will rigidly engage the said pole 10 and stub 11 when holding the same against accidental displacement from the said saddles, as illustrated.

It will thus be noted from the foregoing description and accompanying drawing that this invention provides an exceedingly useful and advantageous clamp for use upon poles and the like, although I have shown my invention as applied to a telegraph pole and stub therefor in strengthening the same after its base has been materially deteriorated, it is of course obvious that this form of clamp may be applied effectually as well to top sails and main masts of ships and equally as well on flag poles.

The invention is susceptible of various changes in its form, proportions and minor details of construction, and the right is herein reserved to make such changes as properly fall within the scope of the appended claim.

Having described my invention what is claimed is:

A clamp device for connecting two poles together, comprising a saddle member designed to be inserted between two pole members and to substantially conform to the contour of the adjacent sides of both pole members, a band for encircling both poles, and a bolt passed through both sides of the band and also passed through the saddle between the poles to thereby provide means whereby the band may be tightened and the saddle, band and both pole members held in their relative positions.

Des Moines, Iowa, May 26, 1927.

HARRY R. LONGANECKER.